Patented July 12, 1938

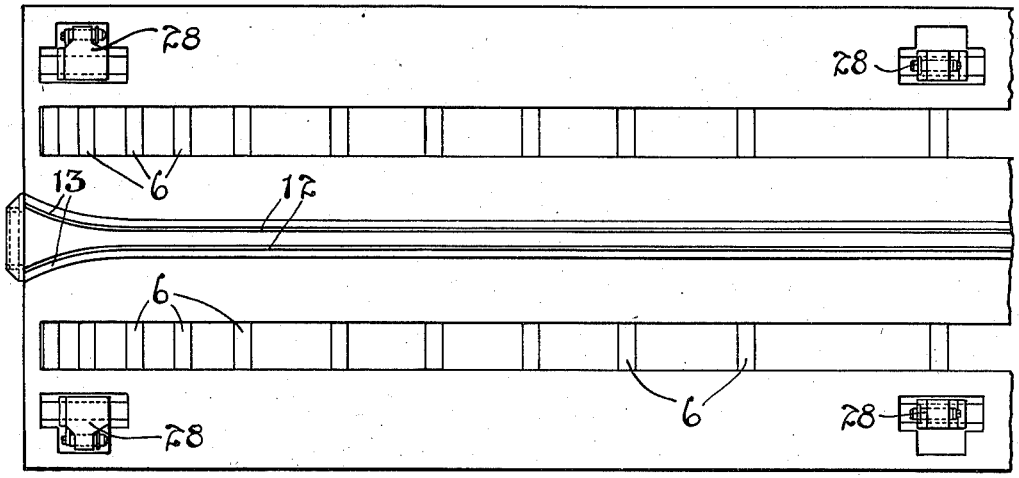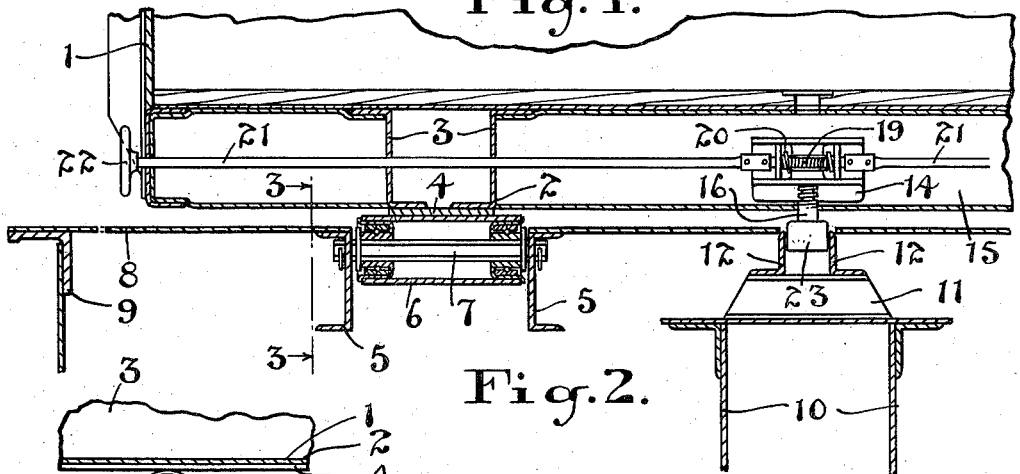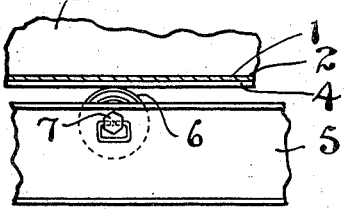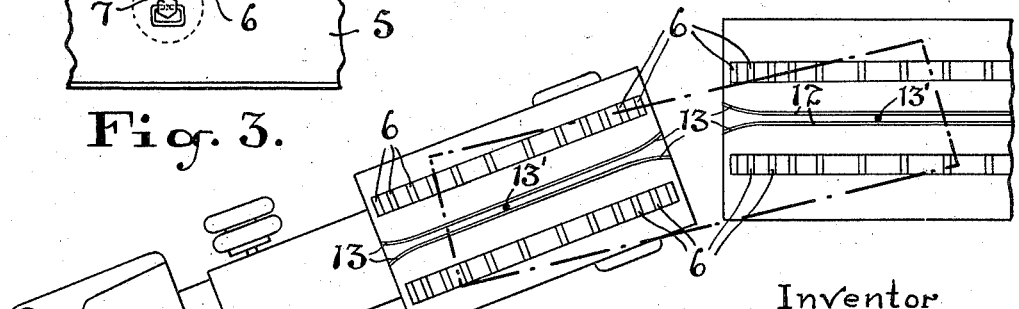
July 12, 1938. W. P. KELLETT 2,123,424
APPARATUS FOR TRANSFERRING CONTAINERS
Filed Aug. 24, 1936
Inventor
William Platts Kellett

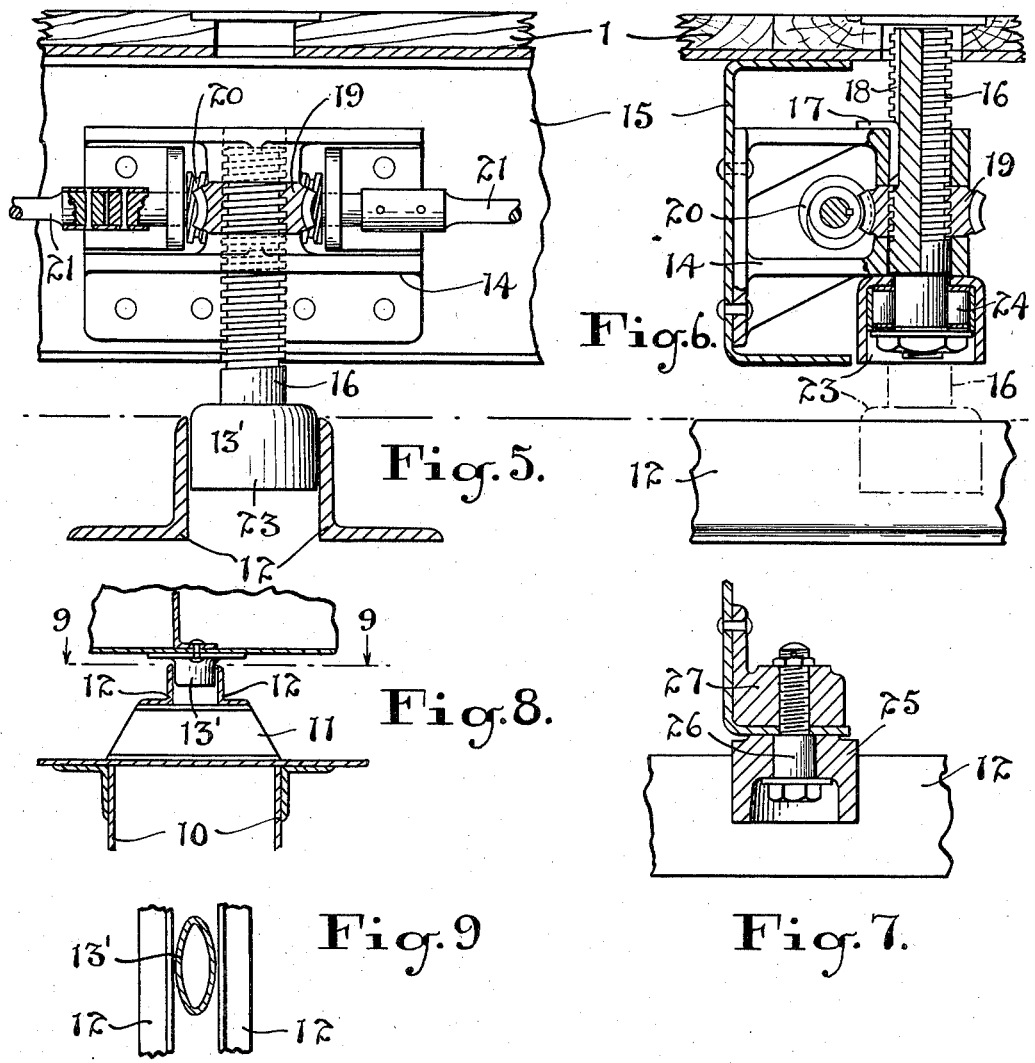

2,123,424

UNITED STATES PATENT OFFICE 2,123,424

APPARATUS FOR TRANSFERRING CONTAINERS

William Platts Kellett, New York, N. Y.

Application August 24, 1936, Serial No. 97,628

7 Claims. (Cl. 214—38)

The principal objects of this invention are to facilitate the transferring of portable goods containers between rail cars and highway trucks, so that it will not be necessary to accurately align the truck with the rail car preparatory to making the transfer, thereby effecting a considerable saving of time in the transfer operation.

A further and important object of the invention is to provide rail car, truck and co-operating container structures which will be subject to the least possible stress and injury in the operation of transferring the container from one vehicle to the other and which will require the minimum of labor in such operation.

The principal features of the invention consist in the provision of rolling contact surfaces between the container and truck or car decks which will permit both longitudinal and lateral movement of the container and in the arrangement of longitudinal guide-ways on either the vehicles or the container to engage spaced lug projections on the other relatively movable member (vehicle or container) to guide the container into a transversely central position on the vehicle and to assist in maintaining the container in the centralized position.

In the accompanying drawings, Figure 1 is a plan view of a portion of a car or truck deck equipped with surface rollers and a central guideway in accordance with this invention.

Figure 2 is an enlarged typical cross sectional view of one half of the structure illustrated in Figure 1 and a cross sectional view of one-half of a container showing the preferred form of guide lug for engaging with the longitudinal guide way on the vehicle.

Figure 3 is a detail sectional elevational view taken on the line 3—3 of Figure 2.

Figure 4 is a plan view of a highway truck and a portion of a rail car shown with their ends adjacent and illustrating a container (in dotted lines) being transferred from one to the other.

Figure 5 is an enlarged elevational part sectional detail of the adjustable guide member shown in Figure 2.

Figure 6 is a vertical mid-sectional detail of the guide member illustrated in Figure 5, taken at right angles to the view shown in Figure 5.

Figure 7 is a vertical sectional detail of a modified form of guide lug.

Figure 8 is a sectional elevational detail showing a further modified form of guide lug.

Figure 9 is a transverse section through the guide lug shown in Figure 8 taken on the line 9—9.

The development of the transportation of goods in containers by rail and highway vehicles is developing very rapidly and many forms of containers have been devised equipped with wheel supports of various kinds. Such structures may not be found desirable for certain types of service and numerous forms of containers equipped with skids have also been proposed.

In the present application I show the container 1 provided with longitudinal skid members 2 arranged either side of the longitudinal centre line and extending throughout the length of the container. These skids are shown formed of a pair of Z bars 3 with their bottom flanges connected by a plate 4 which presents a smooth sliding surface from end to end.

The car or truck structure is provided with a pair of laterally spaced beam sections 5 arranged one pair each side of and extending longitudinally of the car or truck frame and the paired beams are spaced so that the longitudinal centre line of each pair underlies the centre line of the container skids 2.

Rollers 6 of a suitable design having cylindrical peripheries are arranged to extend transversely between each set of paired beam sections, being mounted on bars 7 extending through holes formed in the webs of the beams.

The rollers 6 are spaced at suitable intervals throughout the length of the car or truck and they project slightly above the tops of the supporting beams and present rolling supports for the skids 2, the cylindrical surfaces permitting the skids to slide freely in a direction transversely of the car or truck, as well as to roll longitudinally.

Deck surfaces 8 are provided between the outward roller supporting beams 5 and the outer side bars 9 of the frame.

The car or truck is formed with a longitudinal box beam structure 10 of suitable design and upon this at intervals throughout the length of the frame are mounted the transversely extending supports 11 which carry a pair of angle irons, or other suitable steel sections 12, which are spaced apart and form a guideway which extends throughout the length of the frame, the ends 13 of said guide sections 12 being flared outwardly.

Guide lugs 13' are mounted on the underside of the container structure on the longitudinal centre line of same and these are spaced a short distance inwardly from each end of the container. These lugs are adapted to enter the flared ends 13 of the guideways 12 and guide the container on to the car or truck, holding the end moving on to said car or truck in a centralized position and holding the end moving off said car or truck in a centralized position, even though the centre lines of the car and truck are considerably out of alignment.

It will be understood that if the car and truck are out of alignment the skid members 2 will slide transversely on the roller surfaces while being rolled into position.

The preferred form of guide lugs 13' is illustrated in Figures 2, 5 and 6 and comprise a bracket member 14 rigidly secured to the bolster structure 15 of the container centrally of the width of the container. A threaded spindle 16 is mounted in the bracket and is free to slide vertically therein, being held from rotation by a key 17 sliding in a key-way 18 in the spindle.

A nut 19 rotatably mounted in a bearing in the bracket encircles the spindle and is formed with a toothed periphery engaging a worm 20 horizontally journalled in the bracket.

The worm 20 is operated from either side of the container by shafts 21 connected with the worm and extending to opposite sides of the container where they are provided with hand wheels 22 at the outer ends. In this way each spindle 16 may be operated independent of the other spindle and from either side of the container.

The spindle 16 has a roller 23 mounted on suitable bearings 24 at its lower end and it is adapted to engage in rolling contact with the guide bars 12, that is, when the spindle is lowered. The provision of the adjustable guide-rollers permits the lifting of the guide lugs so that they will not be damaged while the container may be moved about on its skids, but when the container is about to be placed on a truck or car the roller guide members are lowered so as to enter the centre guide-way.

It is important to note that the independent operability of the guide spindles 16 greatly facilitates manipulation of the container under various loading conditions encountered, permitting either one of the guide members to be moved clear of the guideway of either vehicle to permit lateral manipulation of the end of the container while maintaining the desired guiding contact of the other guide member.

Other forms of guide lugs may be used if desired. In Figure 7 I show a roller 25 mounted on a pin 26 secured in a bracket 27 which may be secured rigidly to the container structure.

In Figures 8 and 9 I show a rigid block which has an oval or elliptical shape which is adapted to enter the guide-ways and engages the guide bars in sliding contact.

It will be readily understood that in moving a container from a truck to a car or vice versa, the container will roll easily upon its roller supports and will slide laterally to enable the operators to cause the guide lug to enter the guideway on the vehicle onto which it is being moved. As the movement of the container continues the guide lugs hold the container to travel along the centre lines and as the guide lugs are arranged near the ends of the container the container may move in an angular direction quite freely.

Suitable holding jacks 28 are arranged on the transport vehicles to lock the containers securely in position during transport, but the details of these are not described as they do not form part of the present invention.

The drawings herein shown illustrate the car and truck deck as being equipped with rollers, but it must be understood that the container may be equipped with castors or rollers and the car or truck provided with a smooth deck, the container being guided by the centrally arranged guide-way engaging the spaced apart lugs and said guide-way may be either on the car or on the container.

What I claim as my invention is:—

1. Transport equipment for containers comprising in combination, a railway car and a road truck, each having spaced longitudinal rows of deck rollers, a container, and means for enabling the guided rolling of said container to and from said railway car and road truck with said respective vehicles disposed in wide angular positions relative to each other, said means including central longitudinal guideways rigidly carried respectively by the car and road truck spaced below the level of the upper extremities of the rollers to permit the roller-engaging portions of the container to pass thereover at a wide angle clear of contact therewith in a bridge-like manner while supported on opposite sides of the guideway by the deck rollers.

2. Transport equipment including in combination a transport vehicle, a container, co-operative means carried by the vehicle and container to form a rolling contact therebetween, a guideway longitudinally parallelling one of said units, a pair of longitudinally spaced guide members adjustably mounted on the other of said units for selective or collective guiding contact with said guideway, and means operable to selectively displace said guide members independently into and out of co-operation with said guideway whereby to facilitate manipulation of the container on the rolling support under certain loading or unloading conditions.

3. Transport equipment for containers comprising in combination a railway car and a road truck, each having spaced longitudinal rows of deck rollers, a container, and means for enabling the guided rolling of said container to and from said railway car and road truck with said respective vehicles disposed in wide angular positions relative to each other, said means including central longitudinal guideways rigidly carried respectively by the car and road truck spaced below the level of the upper extremities of the rollers to permit the roller-engaging portions of the container to pass thereover at a wide angle clear of contact therewith in a bridge-like manner while supported on opposite sides of the guideway by the deck rollers, said means also including guide members carried by the container on the longitudinal vertical centre plane thereof independently displaceable in said plane into and out of guiding relation to the guideways of said car and truck.

4. Transport equipment for containers comprising in combination a railway car and a road truck, each having spaced longitudinal rows of deck rollers, a container, means for enabling the guided rolling of said container to and from said railway car and road truck with said respective vehicles disposed in wide angular positions relative to each other, said means including central longitudinal guideways rigidly carried respectively by the car and road truck spaced below the level of the upper extremities of the rollers to permit the roller-engaging portions of the container to pass thereover at a wide angle clear of contact therewith in a bridge-like manner while supported on opposite sides of the guideway by the deck rollers, said means also including guide members carried by the container on the longitudinal vertical centre plane thereof independently displaceable in said plane into and out of guiding relation to the guideways of said car and truck, and means operable to selectively displace said guide members into or out of co-operative relation to the guideways of the car and truck whereby either end of the container may be manipulated on the one vehicle independent of guiding connection therewith while the other end of the container may be guided longitudinally of the other vehicle or guiding connection may be had with both vehicles in accordance with the loading or unloading conditions encountered.

5. Transport equipment for containers comprising in combination a railway car and a road truck, each having spaced longitudinal rows of deck rollers, a container, means for enabling the guided rolling of said container to and from said railway car and road truck with said respective vehicles disposed in wide angular position relative to each other, said means including central longitudinal guideways rigidly carried respectively by the car and road truck spaced below the level of the upper extremities of the rollers to permit the roller-engaging portions of the container to pass thereover at a wide angle clear of contact therewith in a bridge-like manner while supported on opposite sides of the guideway by the deck rollers, said means also including guide members carried by the container on the longitudinal vertical centre plane thereof independently displaceable in said plane into and out of guiding relation to the guideways of said car and truck, and means manually operable to displace said guide members selectively from below the plane of rolling support of the container to above said plane of support to selectively clear the guideway of the car or truck and permit movement of the non-guided end transversely of the adjacent guideway.

6. Transport equipment as claimed in claim 4 in which said operable means includes operating means extending from each of said displaceable guide members to opposite sides of the container for manual operation from either side, the operating means of one of said guide members being independent of and operable separate from the operating means of the other of said guide members.

7. Transport equipment including in combination a transport vehicle, a container, co-operative means carried by the vehicle and container to form a rolling contact therebetween, a guideway longitudinally parallelling one of said units, a pair of threaded spindles vertically displaceable on the other of said units in the centre longitudinal plane thereof having relatively rotatable portions for selective or collective rolling guiding contact with the said guideway, a pair of operating shafts extending from adjacent each of said threaded spindles to opposite sides of the second-mentioned unit, and means operatively interposed between each of said threaded spindles and their respective paired shafts so constructed and arranged that either of said threaded spindles may be operated by its respective shafts independently of the other to bring its relatively rotatable portion into or out of rolling guiding contact with the guideway of the other unit to permit extensive angular manipulation of the container on the vehicle in loading and unloading.

WILLIAM PLATTS KELLETT.